(12) United States Patent
Kang et al.

(10) Patent No.: US 9,447,285 B2
(45) Date of Patent: Sep. 20, 2016

(54) COATING COMPOSITION

(71) Applicant: LG CHEM, LTD., Seoul (KR)

(72) Inventors: Joon Koo Kang, Daejeon (KR); Yeong Rae Chang, Daejeon (KR); Sung Don Hong, Daejeon (KR); Seung Jung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/777,003

(22) PCT Filed: Mar. 13, 2014

(86) PCT No.: PCT/KR2014/002124
§ 371 (c)(1),
(2) Date: Sep. 15, 2015

(87) PCT Pub. No.: WO2014/142580
PCT Pub. Date: Sep. 18, 2014

(65) Prior Publication Data
US 2016/0040016 A1    Feb. 11, 2016

(30) Foreign Application Priority Data

Mar. 15, 2013  (KR) ........................ 10-2013-0028140
Mar. 12, 2014  (KR) ........................ 10-2014-0029032

(51) Int. Cl.
| C08F 2/50 | (2006.01) |
| C08F 2/46 | (2006.01) |
| C08G 61/04 | (2006.01) |
| C09D 4/06 | (2006.01) |
| C09D 4/00 | (2006.01) |
| C09D 7/12 | (2006.01) |
| C09D 175/04 | (2006.01) |
| C09D 5/00 | (2006.01) |

(52) U.S. Cl.
CPC . *C09D 4/06* (2013.01); *C09D 4/00* (2013.01); *C09D 5/00* (2013.01); *C09D 7/12* (2013.01); *C09D 7/1225* (2013.01); *C09D 175/04* (2013.01)

(58) Field of Classification Search
CPC ......... C09D 4/06; C09D 5/00; C09D 7/1225
USPC ................ 522/64, 6, 71, 189, 184, 1; 520/1
See application file for complete search history.

(56) References Cited

U.S. PATENT DOCUMENTS

| 3,782,961 A | 1/1974 | Takahashi et al. |
| 7,098,257 B2 | 8/2006 | Rink et al. |
| 2006/0025534 A1 | 2/2006 | Johnson et al. |
| 2007/0254166 A1* | 11/2007 | Qiu .................. C08L 83/08 428/447 |
| 2011/0060065 A1 | 3/2011 | Vu et al. |

FOREIGN PATENT DOCUMENTS

| JP | 2003-76009 A | 3/2003 |
| JP | 2010-280832 A | 12/2010 |
| KR | 10-0748219 B1 | 8/2007 |
| KR | 10-2007-0096328 A | 10/2007 |
| KR | 10-2007-0096329 A | 10/2007 |
| KR | 1020070096329 | * 10/2007 |
| KR | 10-0858390 B1 | 9/2008 |
| KR | 10-2009-0044089 A | 5/2009 |
| KR | 10-2009-0057597 A | 6/2009 |
| KR | 10-0926220 B1 | 11/2009 |
| KR | 10-2010-0026014 A | 3/2010 |
| KR | 10-2010-0036944 A | 4/2010 |
| KR | 10-2010-0041992 A | 4/2010 |
| KR | 10-2010-0114028 A | 10/2010 |
| KR | 10-1127952 B1 | 3/2012 |
| KR | 10-1174951 B1 | 8/2012 |
| KR | 10-2012-0136597 A | 12/2012 |
| WO | 02/10292 | * 2/2002 |
| WO | 02/10292 A1 | 2/2002 |

OTHER PUBLICATIONS

Jun et al, 1020070096329 Machine Translation, Oct. 2, 2007.*
International Search Report issued in International Application No. PCT/KR2014/002124 on Jun. 26, 2014, 2 pages.
Search Report issued in European Application No. 14765052.7 dated Jun. 9, 2016, 7 pages.

* cited by examiner

*Primary Examiner* — Ling Choi
*Assistant Examiner* — Jessica E Whiteley
(74) *Attorney, Agent, or Firm* — Rothwell, Figg, Ernst & Manbeck, P.C.

(57) ABSTRACT

The present invention relates to a coating composition. More particularly, the present invention relates to a composition capable of forming a plastic film which exhibits high hardness and excellent processability. According to the coating composition of the present invention, a plastic film with the rare occurrence of curling and high hardness can be provided.

11 Claims, No Drawings

COATING COMPOSITION

CROSS REFERENCE TO RELATED APPLICATIONS

This application is a 35 U.S.C. §371 National Phase Entry Application from PCT/KR2014/002124, filed Mar. 13, 2014, and designating the United States, which claims priority under 35 U.S.C. §119 to Korean Patent Application No. 10-2013-0028140 filed on Mar. 15, 2013 and to Korean Patent Application No. 10-2014-0029032 filed on Mar. 12, 2014, which are incorporated herein by reference in their entireties.

BACKGROUND OF THE INVENTION (a) Field of the Invention

The present invention relates to a coating composition. More particularly, the present invention relates to a composition capable of forming a plastic film which exhibits high hardness and excellent processability.

This application claims the benefit of Korean Patent Application No. 10-2013-0028140, filed on Mar. 15, 2013 and Korean Patent Application No. 10-2014-0029032, filed on Mar. 12, 2014, which are all hereby incorporated by reference in their entireties into this application.

(b) Description of the Related Art

With the advance of mobile appliances such as smart phones, tablet PCs or the like, substrates for displays have recently been required to become lighter and slimmer. Display windows or front panels of such mobile appliances are generally made of glass or reinforced glass both of which have excellent mechanical properties. However, glass suffers from the disadvantage that its own weight makes mobile appliances heavy and it is easily broken by an external impact.

As an alternative to glass, plastic resins have been studied. The plastic resin films are light in weight and resistant to impact, and thus are consistent with the trend of pursuing lighter mobile appliances. Particularly, to achieve a film with properties of high hardness and wear resistance, it is proposed to utilize a film in which a support substrate is coated with a hard coating layer.

Increasing the thickness of the hard coating layer is considered as an approach to improving the surface hardness thereof. The hard coating layer should be of a predetermined thickness to ensure the surface hardness sufficient as the alternative to glass. However, as the hard coating layer increases in thickness, the surface hardness thereof may become higher, but the hard coating layer is more prone to setting shrinkage which leads to wrinkling or curling with the concomitant production of cracks or exfoliations, and thus the coating layers are difficult to employ in practice.

Recently, some methods have been proposed for conferring a high hardness on hard coating films, without the problems of cracking and setting shrinkage-induced curling.

Korean Patent Publication No. 2010-0041992 discloses a plastic film composition, free of monomers, including a binder resin based on ultraviolet-curable polyurethane acrylate-based oligomers. However, this plastic film has a pencil hardness of about 3H, and thus the strength thereof is not sufficient to be a substitute for glass panels for displays.

SUMMARY OF THE INVENTION

In order to solve the above problems, the present invention provides a coating composition capable of forming a plastic film which exhibits high hardness and excellent processability without the occurrence of curling, warping or cracking.

In order to solve the above problems, the present invention provides a coating composition including a tri- to hexafunctional acrylate-based monomer, a thermosetting prepolymer composition, a photoinitiator, an inorganic fine particle, and an organic solvent.

According to the coating composition of the present invention, a plastic film which exhibits high hardness, impact resistance, scratch resistance, high transparency, and which is superior in terms of processability to be less prone to curling or cracking can be fabricated. The plastic film can be usefully applied to mobile appliances, display instruments, and front panels and display windows of various instruments as an alternative to a cover plate made of glass or reinforced glass.

DETAILED DESCRIPTION OF THE EMBODIMENTS

A coating composition of the present invention includes a tri- to hexafunctional acrylate-based monomer, a thermosetting prepolymer composition, a photoinitiator, an inorganic fine particle, and an organic solvent.

As used herein, the term "first", "second", etc. is employed only to describe various elements, and is intended to discriminate one element from another.

All of the terms used in the specification are taken only to illustrate embodiments, and are not intended to limit the present invention. The singular forms include plural references unless the context clearly dictates otherwise. It is to be noticed that the term "include", "including", "having" etc., as used herein, is to be interpreted as specifying the presence of the stated features, steps, components, or combinations thereof, but does not preclude the presence or addition of one or more other features, steps, components, or combinations thereof.

Additionally, the word "on" or "above", as used in the context of formation of one element, means pertaining to the direct formation of one element on another element or the additional formation of one element between layers or on a subject or substrate.

The present invention may be modified in various ways and include several embodiments. Specific embodiments are illustrated and described in detail below. The present invention, however, should not be construed as limited to the exemplary embodiments set forth herein but may include any modifications, equivalents or alternatives within the spirit and scope of the present invention.

Hereinafter, the coating composition of the present invention will be described in more detail.

The present invention provides a coating composition including a tri- to hexafunctional acrylate-based monomer, a thermosetting prepolymer composition, a photoinitiator, an inorganic fine particle, and an organic solvent.

The term "acrylate-based," throughout the present specification, is intended to encompass acrylate, methacrylate, and derivatives thereof introduced with various substituents.

The tri- to hexafunctional acrylate-based monomer may be trimethylolpropane triacrylate (TMPTA), trimethylolpropane ethoxy triacrylate (TMPEOTA), glycerin-propoxylated triacrylate (GPTA), pentaerythritol tetraacrylate (PETA), dipentaerythritol hexaacrylate (DPHA) or the like. These tri- to hexafunctional acrylate-based monomers may be used alone or in combination of different types thereof.

When irradiated with UV light, the tri- to hexafunctional acrylate-based monomers may be crosslinked with each other to form a crosslinked copolymer which confers high hardness on the coating layer formed by including the crosslinked copolymer.

According to one embodiment of the present invention, the tri- to hexafunctional acrylate-based monomer may be used in an amount of approximately 40 to approximately 80 parts by weight, or approximately 50 to approximately 80 parts by weight, based on 100 parts by weight of the solid component including the tri- to hexafunctional acrylate-based monomer, the thermosetting prepolymer composition, the photoinitiator, and the inorganic fine particle (when the thermosetting prepolymer composition is in a dissolved form in a solvent, only the solid component is considered with the exclusion of the solvent). When used in such amounts, the tri- to hexafunctional acrylate-based monomer can endow the plastic film with good physical properties such as high hardness, scratch resistance, etc.

The coating composition of the present invention includes the thermosetting prepolymer composition. Herein, the "thermosetting prepolymer composition" means a composition including two or more different oligomers or polymers having functional groups which are able to undergo crosslinking polymerization by thermosetting, and may be contained as being or being not dissolved in a solvent in the coating composition.

According to one embodiment of the present invention, the thermosetting prepolymer composition may include a polyester-based polyurethane oligomer, a polyol, and a polyisocyanate. More specifically, the thermosetting prepolymer composition may contain 10 to 40% by weight of the polyester-based polyurethane oligomer, 5 to 30% by weight of the polyol, and 50 to 80% by weight of the polyisocyanate, based on the total weight of the solid components thereof, but the present invention is not limited thereto.

According to one embodiment of the present invention, the polyester-based polyurethane oligomer may be those having the physical properties of a number average molecular weight of approximately 1,000 to approximately 100,000 g/mol, a viscosity of approximately 100 to approximately 3,000 cps when dissolved at a concentration of 15% in cyclohexane, and Tg of −30 to 40° C., but the present invention is not limited thereto. The polyester-based polyurethane oligomers with such physical properties may be directly synthesized or may be commercially purchased. The commercially available products may be exemplified by ESTANE® 5701 TPU, ESTANE® 5703 TPU, ESTANE® 5707 TPU, ESTANE® 5708 TPU, ESTANE® 5713 TPU, ESTANE® 5714 TPU, ESTANE® 5715 TPU, ESTANE® 5719 TPU, or ESTANE® 5778 TPU, all from Noveon.

According to one embodiment of the present invention, the polyol may have a number average molecular weight of approximately 1,000 to approximately 100,000 g/mol. In addition, the type of the polyol is not particularly limited, but may be preferably one or more selected from the group consisting of polyethylene glycol polyol, polycarprolactone polyol, polyester polyol, polyether polyol, polyacryl polyol, and polycarbonate polyoldiol. Preferably, more specific examples of the polyol include 1,4-butanediol, diethylene glycol, dipropylene glycol, polyalkylene glycol having an alkyl of 1 to 5 carbon atoms, and polyalkylene ether polyol. The polyalkylene ether polyol may be one or more selected from the group consisting of polytetramethylene ether glycol, poly(oxytetramethylene)ether glycol, poly(oxytetraethylene)ether glycol, poly(oxy-1,2-propylene)ether glycol, and poly(oxy-1,2-butylene)ether glycol.

According to one embodiment of the present invention, the polyisocyanate may have a number average molecular weight of approximately 500 to approximately 50,000 g/mol. In addition, the type of the polyisocyanate is not particularly limited, but is preferably a polymer polymerized from aliphatic and aromatic isocyanates. More specific examples of the aliphatic diisocyanate may include 1,4-tetramethylene diisocyanate, 1,6-hexamethylene diisocyanate, 1,4-cyclohexyl diisocyanate, isophorone diisocyanate, and α,α-xylylene diisocyanate. Examples of the aromatic polyisocyanate may include 4,4'-dimethylmethane diisocyanate, 1,3-phenylene diisocyanate or toluene diisocyanate. In addition, polyisocyanate polymerized from dimers or trimers of the above described diisocyanates may be used.

The above described components included in the thermosetting prepolymer composition are crosslinked with each other by thermosetting to form a thermosetting resin which confers high hardness and processability on the coating layer.

According to the present invention, since the thermosetting prepolymer composition, in addition to the binder containing the tri- to hexafunctional acrylate monomers crosslinked by photo-irradiation, may be included, a setting shrinkage or curl phenomenon in which a substrate is rolled up together with a coating layer during photocuring of the tri- to hexafunctional acrylate monomers can be prevented. The curling phenomenon is a phenomenon in which the edge or the like of a planar film is curvilinearly warped or rolled up when the planar film is spread on a flat plate, and this curling phenomenon occurs when acrylate is contracted during photocuring by ultraviolet irradiation.

For use as an alternative to a cover plate, a plastic film must be improved in surface hardness to a degree high enough to substitute for glass. Basically, the coating layer is required to have a predetermined thickness, in order to improve hardness of the plastic film. However, a thicker coating layer is more prone to setting shrinkage which leads to increased curling and decreased adhesiveness, and rolling up of the plastic film. In this regard, a planarization process of the substrate may be additionally employed. Undesirably, the coating layer is likely to crack during planarization. Accordingly, it is difficult to prepare a plastic film which is high enough in hardness to substitute for glass, without a decrease in physical properties of the film.

According to the present invention, the presence of the thermosetting prepolymer composition in addition to the photocurable acrylate-based monomer allows the plastic film to maintain high hardness and to prevent photocuring-induced curling. In addition, toughness of the plastic film is improved to increase processability thereof. Hence, physical properties of the plastic film can be reinforced.

According to one embodiment of the present invention, the tri- to hexafunctional acrylate-based monomer and the thermosetting prepolymer composition (when the thermosetting prepolymer composition is in a dissolved form in a solvent, only the solid component is considered with the exclusion of the solvent) may be included at a weight ratio of approximately 1:0.01 to approximately 1:3, or approximately 1:0.1 to approximately 1:2, or approximately 1:0.1 to approximately 1:1.5, or approximately 1:0.1 to 1:1.2. Given the amounts of the tri- to hexafunctional acrylate-based monomer and the thermosetting prepolymer composition within the above ranges, the plastic film can be formed with good processability while retaining high hardness.

According to one embodiment of the present invention, the thermosetting prepolymer composition may be used in an amount of approximately 5 to approximately 50 parts by weight, or approximately 10 to approximately 40 parts by weight, based on 100 parts by weight of the solid component of the composition including the tri- to hexafunctional acrylate-based monomer, the thermosetting prepolymer composition, the photoinitiator, and the inorganic fine particle (when the thermosetting prepolymer composition is in a dissolved form in a solvent, only the solid component is considered with the exclusion of the solvent). When used in such amounts, the thermosetting prepolymer composition can endow the plastic film with good physical properties such as high hardness, high processability or the like.

According to one embodiment of the present invention, the thermosetting prepolymer composition may further include a catalyst for promoting a thermosetting reaction. So long as it is known to promote the condensation of the thermosetting prepolymer composition, any catalyst may be available without limitations thereto. In detail, the catalyst may be one or more selected from the group consisting of dibutyltindilaurate (DBTDL), zinc octoate, iron acetyl acetonate, N,N-dimethyl ethanolamine, and triethylene diamine. These catalysts may be used alone or in combination of two or more thereof.

According to one embodiment of the present invention, the catalyst may be contained in an amount of approximately 0.01 to approximately 1,000 ppm, or approximately 0.1 to approximately 100 ppm in the thermosetting prepolymer composition. Given within the quantity range, the catalyst can perform sufficient thermosetting polymerization, without deteriorating the physical properties of the composition.

The coating composition of the present invention includes a photoinitiator.

According to one embodiment of the present invention, the photoinitiator may be 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, $\alpha,\alpha$-dimethoxy-$\alpha$-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphine oxide, or bis(2,4,6-trimethylbenzoyl)-phenylphosphine oxide, but is not limited thereto. In addition, it may be commercially available under the trade name of, for example, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, etc. These different photoinitiators may be used alone or in combination of two or more thereof.

According to one embodiment of the present invention, the photoinitiator may be used in an amount of approximately 0.2 to approximately 5 parts by weight, or approximately 0.5 to approximately 3 parts by weight, based on 100 parts by weight of a solid component including the tri- to hexafunctional acrylate-based monomer, the thermosetting prepolymer composition, the photoinitiator, and the inorganic fine particle. When used in such amounts, the photoinitiator allows for sufficient crosslinking polymerization, without deteriorating physical properties of the plastic film.

The coating composition of the present invention includes an inorganic fine particle.

According to one embodiment of the present invention, the inorganic fine particles may be an inorganic fine particle having a diameter in the nanoscale. For example, they may have a diameter of approximately 100 nm or less, or approximately 10 to approximately 100 nm, or approximately 10 to approximately 50 nm. As the inorganic fine particles, for example, silica particles, aluminum oxide particles, titanium oxide particles, or zinc oxide particles may be employed.

The inorganic fine particles are included to further reinforce the hardness of the plastic film.

According to one embodiment of the present invention, the inorganic fine particle may be included in an amount of approximately 5 to approximately 40 parts by weight, or approximately 10 to approximately 40 parts by weight, based on 100 parts by weight of a solid component including the tri- to hexafunctional acrylate-based monomer, the thermosetting prepolymer composition, the photoinitiator, and the inorganic fine particle. When included in such amounts, the inorganic fine particle can bring about an improvement in the hardness of the plastic film without deteriorating the physical properties thereof.

The coating composition of the present invention includes an organic solvent.

According to one embodiment of the present invention, the organic solvent may be an alcohol solvent such as methanol, ethanol, isopropyl alcohol, and butanol; an alkoxy alcohol solvent such as 2-methoxyethanol, 2-ethoxyethanol, and 1-methoxy-2-propanol; a ketone solvent such as acetone, methylethylketone, methylisobutyl ketone, methylpropyl ketone, and cyclohexanone; an ether solvent such as propylene glycol monopropylether, propyleneglycol monomethyl ether, ethylene glycol monethylether, ethyleneglycol monopropylether, ethyleneglycolmonobutylether, diethyleneglycolmonomethylether, diethylglycolmonoethyl ether, diethylglycolmonopropylether, diethylglycolmonobutylether, diethyleneglycol-2-ethylhexyl ether; an aromatic solvent such as benzene, toluene, and xylene; and they may be used alone or in combination thereof.

According to one embodiment, the content of the organic solvent may be variously adjusted to the degree that the physical properties of the coating composition of the present invention are not degraded. The organic solvent may be used in such an amount that the weight ratio of the solid component to the organic solvent ranges from approximately 70:30 to approximately 99:1, based on 100 parts by weight of the solid component including the tri- to hexafunctional acrylate-based monomer, the thermosetting prepolymer composition, the photoinitiator, and the inorganic fine particle, but is not particularly limited. Given the amount of organic solvent within the above ranges, it can exert proper fluidity and coatability.

Meanwhile, the coating composition of the present invention may further include an additive typically used in the art to which the present invention pertains, such as a surfactant, a yellowing inhibitor, a leveling agent, an antifouling agent or the like, in addition to the above described components. Here, its content may be variously adjusted to the degree that the physical properties of the coating composition of the present invention are not degraded. Its content is not particularly limited, but, for example, ranges from approximately 0.1 to approximately 10 parts by weight, based on 100 parts by weight of the coating composition.

According to one embodiment of the present invention, the coating composition may include a surfactant as an additive. The surfactant may be a mono- or bi-functional fluorine acrylate, a fluorine surfactant, or a silicon surfactant. In this regard, the surfactant may be contained in a dispersed or crosslinked form in the crosslinked copolymer.

Further, a yellowing inhibitor may be included as an additive. The yellowing inhibitor may be a benzophenone compound, a benzotriazole compound or the like.

According to one embodiment of the present invention, no particular limitations are imposed on the viscosity of the coating composition when it exhibits suitable fluidity and coatability. For example, the coating composition may have a viscosity of approximately 1,200 cps or less at 25° C.

The coating composition of the present invention including the above described components is applied onto a support substrate, thereby forming a coating layer by photocuring and thermosetting.

According to one embodiment of the present invention, the coating composition of the present invention is used to form a coating layer having a thickness of approximately 50 µm or higher, for example, approximately 50 to approximately 300 µm, approximately 50 to approximately 200 µm, approximately 50 to approximately 150 µm, or approximately 70 to approximately 150 µm.

The film including the coating layer which is formed by using the coating composition of the present invention exhibits excellent hardness, impact resistance, scratch resistance, high transparency, durability, light resistance, high light transmittance or the like, and thus it has useful applications in various fields.

The coating layer which is formed by using the coating composition of the present invention may be formed only on one side of the substrate.

The coating layer which is formed by using the coating composition of the present invention may be formed on both sides of the substrate.

When the coating layer is formed on both sides of the substrate, the coating composition may be applied onto the front and back sides of the support substrate in a sequential or simultaneous manner. At this time, after application of the coating composition, a process of drying the coating composition at a predetermined temperature may be further carried out, in order to evaporate the solvent and to form a planar film.

According to one embodiment of the present invention, a first coating composition is first applied onto one side of the substrate, and photocured and thermoset by heating it to a predetermined temperature, after which a second coating composition is subsequently applied onto the other side, that is, the back side of the substrate, and then photocured and thermoset by heating it to a predetermined temperature. In this regard, the first and the second coating compositions are the same as the above described coating composition and are just terminologically discriminated for application to opposite respective sides of the substrate. The order of photocuring and thermosetting may be also changed.

As the thickness of the coating layer is increased, UV light does not sufficiently reach the bottom of the coating layer, causing a problem of incomplete curing of the coating layer. According to the present invention, the curing of the thermosetting prepolymer composition under heat and UV can compensate for the insufficient photocuring which might occur, thereby reinforcing the hardness and physical properties of the coating layer.

Further, the thermosetting for curing the thermosetting prepolymer composition may be optionally carried out once or more times before and/or after UV irradiation for photocuring. The thermosetting may be achieved by heating at approximately 60 to approximately 140° C., at approximately 80 to approximately 130° C., or at approximately 80 to approximately 120° C. for approximately 1 minute to approximately 1 hour, or for approximately 2 minutes to approximately 30 minutes.

According to one embodiment of the present invention, when a support substrate piece with dimensions of 10 cm×10 cm, obtained by applying the coating composition onto one side of the support substrate and curing it under light and heat, is placed on a flat plane, a maximal distance at which each edge or side is apart from the plane may be 3 cm or less, or 2.5 cm or less, or 2.0 cm or less.

According to one embodiment of the present invention, when the plastic film formed by using the coating composition is disposed on a plane after exposure to a temperature of 50° C. or higher at a humidity of 80% or higher for 70 hours, the maximum distance at which each edge or side of the plastic film is spaced apart from the plane may be approximately 1.0 mm or less, approximately 0.6 mm or less, or approximately 0.3 mm or less. More particularly, when the plastic film is disposed on a plane after exposure to a temperature of 50° C. to 90° C. at a humidity of 80% to 90% for 70 to 100 hrs, each edge or side of the plastic film is spaced apart from the plane by approximately 1.0 mm or less, approximately 0.6 mm or less, or approximately 0.3 mm or less, maximally.

Exhibiting excellent high hardness, high processability, scratch resistance, high transparency, durability, light resistance, light transmittance or the like, the plastic film formed by using the coating composition of the present invention has useful applications in various fields.

For example, the plastic film formed by using the coating composition of the present invention may have a pencil hardness of 6H or more, 7H or more, or 8H or more under a load of 1 kg.

In addition, the plastic film formed by using the coating composition of the present invention exhibits superiority in terms of impact resistance, so that it can be used as a substitute for glass. For example, the plastic film of the present invention may not crack even after a steel bead weighing 22 g is freely dropped from a height of 40 cm thereto.

Further, after the plastic film is tested by double rubbing 400 times with a steel wool #0000 under a load of 500 g on a friction tester, only two or less scratches may appear.

Further, the plastic film formed by using the coating composition of the present invention may have a light transmittance of 92% or more, and a haze of 1.0% or less, 0.5% or less, or 0.4% or less.

Furthermore, the plastic film formed by using the coating composition of the present invention may have an initial color b* (b* defined by the CIE 1976 L*a*b* color space) of 1.0 or less. After the coating film is exposed to UVB under an ultraviolet lamp for 72 hours or more, it may have a color b* value which differs from the pre-exposed color b* value by 0.5 or less, or by 0.4 or less.

As described above, the plastic film formed by using the coating composition of the present invention can be applied to various fields. For example, it can be used in touch panels of mobile terminals, smart phones or tablet PCs, and cover or device panels of various displays.

Hereinafter, the actions and effects of the present invention will be described in more detail with reference to the specific examples. However, these examples are for illustrative purposes only, and the scope of the invention is not intended to be limited by these examples.

EXAMPLE

Preparation Example 1

Preparation of Thermosetting Prepolymer Composition

To a jacket reactor were placed 50 g of methylethyl ketone and 50 g of cyclohexanone, and then 70 g of polyurethane Estane 5701® (Noveon, polyurethane containing Bronsted salt, number average molecular weight of 40,000), followed by stirring for 2 hours at 80° C.

Afterward, 14 g of polytetramethyleneetherglycol (Terathane 1000®, Mw=1000, Sigma Aldrich), 1.5 g of 1,4-butanediol, and 17 g of a polyester polyol resin (dispersed in n-butyl acetate, Desmophen 670BA®, Bayer) were added to the reactor, and stirred at room temperature for 30 minutes. Subsequently, 124 g of cyclic polyisocyanate (blocked with MEKO, Vestant B 1358A®, Degusa), 0.3 g of dibutyltin dilaurate (DBTDL), and 1.2 g of Tego 410® and 1.2 g of Tego 450® as additives, which are both fluidity improvers, were introduced into the reactor, followed by stirring to the homogeneity to afford a thermosetting prepolymer composition with 70% of the solid content including the polyester-based polyurethane oligomer, polyol and polyisocyanate.

Example 1

A first coating composition was prepared by mixing 2.0 g of the thermosetting prepolymer composition of Preparation Example 1, 9 g of silica-dipentaerythritol hexaacrylate (DPHA) composite in which 40% by weight of nano-silica with a diameter of 20~30 nm was dispersed (3.6 g of silica, 5.4 g of DPHA), 0.2 g of a photoinitiator (brand name: Darocur TPO), 0.1 g of a benzotriazole yellowing inhibitor (brand name: Tinuvin 400), and 0.05 g of a fluorine surfactant (brand name: FC4430). A second coating composition was also prepared in the same manner.

The first coating composition was applied to a PET support substrate with a size of 15 cm×20 cm and a thickness of 188 μm, followed by subjecting the composition to photocuring by irradiating UV light of 280~350 nm using a black light fluorescent lamp and then to thermosetting at 130° C. for 30 minutes to form a first coating layer.

The second coating composition was applied to the back side of the support substrate, followed by subjecting the composition to photocuring by irradiating UV light of 280~350 nm using the black light fluorescent lamp and then to thermosetting at 130° C. for 30 minutes to form a second coating layer. After completion of the curing, each of the first and second coating layers formed on both sides of the substrate had a thickness of 100 μm.

Example 2

A plastic film was fabricated in the same manner as in Example 1, except that 3.6 g of the thermosetting prepolymer composition of Preparation Example 1 was used instead of 2.0 g thereof in Example 1.

Example 3

A plastic film was fabricated in the same manner as in Example 1, except that 9 g of silica-trimethylolpropane triacrylate (TMPTA) composite in which 40% by weight of nano-silica with a diameter of 20~30 nm was dispersed (3.6 g of silica, 5.4 g of TMPTA) was used instead of 9 g of the silica-DPHA composite in Example 1.

Example 4

A plastic film was fabricated in the same manner as in Example 1, except that 0.7 g of the thermosetting prepolymer composition of Preparation Example 1 was used instead of 2.0 g thereof in Example 1.

Example 5

A plastic film was fabricated in the same manner as in Example 1, except that 9.0 g of the thermosetting prepolymer composition of Preparation Example 1 was used instead of 2.0 g thereof in Example 1.

Comparative Example 1

A plastic film was fabricated in the same manner as in Example 1, except that 10 g of DPHA composite was used (4 g of silica, 6 g of DPHA) instead of 9 g of the silica-DPHA composite and the thermosetting prepolymer composition of Preparation Example 1 was not used in Example 1.

Comparative Example 2

A plastic film was fabricated in the same manner as in Example 1, except that 25.0 g of the thermosetting prepolymer composition of Preparation Example 1 was used, instead of 2.0 g thereof in Example 1.

Main components of the compositions used in Examples 1 to 5 and Comparative Examples 1 and 2 are summarized in Table 1, below.

TABLE 1

| | Type and content of tri- to hexafunctional acrylate-based monomer (unit: g) | Silica (unit: g) | Thermosetting prepolymer composition (unit: g) |
|---|---|---|---|
| Example 1 | DPHA, 5.4 | 3.6 | 2.0 (solid content: 1.4 g) |
| Example 2 | DPHA, 5.4 | 3.6 | 3.6 (solid content: 2.5 g) |
| Example 3 | TMPTA, 5.4 | 3.6 | 2.0 (solid content: 1.4 g) |
| Example 4 | DPHA, 5.4 | 3.6 | 0.7 (solid content: 0.5 g) |
| Example 5 | DPHA, 5.4 | 3.6 | 9.0 (solid content: 6.3 g) |
| Comparative Example 1 | DPHA, 6 | 4 | — |
| Comparative Example 2 | DPHA, 5.4 | 3.6 | 25.0 (solid content: 17.5 g) |

Experimental Example

Measurement Methods

1) Pencil Hardness

Hardness was measured using a pencil hardness tester under a load of 1.0 kg according to Measurement Standard JIS K5400 three times, and then the hardness at which no scratches appeared was determined.

2) Scratch Resistance

The film was doubly rubbed 400 times with a steel wool (#0000) in a friction tester under a load of 0.5 kg, and scratches thus formed were counted. Evaluation was made of the scratch resistance of the films by marking ○ for two or less scratches, Δ for two to less than five scratches, and x for five or more scratches.

3) Light Resistance

Differences in color b* value were measured before and after exposure to UVB in a UV lamp for 72 hours or longer.

4) Transmittance and Haze

Transmittance and haze were measured using a spectrophotometer (brand name: COH-400).

5) Curl Property

After the formation of the first coating layer, the film was cut into a piece with dimensions of 10 cm×10 cm and placed on a flat plane. A maximal distance at which each edge or side was apart from the plane was measured.

6) Cylindrical Bending Test

Each of the plastic films was wound on a cylindrical mandrel having a diameter of 3 cm, and cracking occurrence was examined. When the plastic film was not cracked, it was evaluated as OK. If the plastic film was cracked, it was evaluated as X.

7) Impact Resistance

The impact resistance of each of the plastic films was evaluated by determining whether each of the plastic films was cracked when 22 g of a steel ball was dropped thereon from a height of 40 cm. Each of the plastic films was evaluated as OK when it was not cracked, and as X when cracked.

The results of measuring the physical properties are summarized in Table 2, below.

TABLE 2

|  | Example 1 | Example 2 | Example 3 | Example 4 | Example 5 | Comparative Example 1 | Comparative Example 2 |
| --- | --- | --- | --- | --- | --- | --- | --- |
| Pencil Hardness | 9H | 8H | 8H | 9H | 6H | 9H | 4H |
| Scratch resistance | ○ | ○ | ○ | ○ | ○ | ○ | Δ |
| Light resistance | 0.20 | 0.24 | 0.15 | 0.38 | 0.38 | 0.35 | 0.30 |
| Transmittance | 92.3 | 92.1 | 92.4 | 92.0 | 91.8 | 92.3 | 92.0 |
| Haze | 0.2 | 0.3 | 0.2 | 0.2 | 0.4 | 0.3 | 0.4 |
| Bending test | OK | OK | OK | OK | OK | X | OK |
| Curl property | 2.5 cm | 1.5 cm | 2.0 cm | 3.0 cm | 0.5 cm | 4.5 cm | 0.1 cm |
| Impact resistance | OK | OK | OK | OK | OK | X | OK |

As shown in Table 2 above, all of the plastic films of Examples 1 to 5 were found to have good physical properties, particularly, to exhibit excellent processability in terms of curl and bending properties, in addition to high hardness.

What is claimed is:

1. A coating composition, comprising a tri- to hexafunctional acrylate-based monomer, a thermosetting prepolymer composition, a photoinitiator, an inorganic fine particle and an organic solvent, wherein the tri- to hexafunctional acrylate-based monomer and the thermosetting prepolymer composition are used at a weight ratio of 1:0.1 to 1:1.2, as measured on the basis of solid components thereof.

2. The coating composition of claim 1, wherein the thermosetting prepolymer composition includes a polyester-based polyurethane oligomer, polyol and polyisocyanate.

3. The coating composition of claim 2, comprising 10 to 40% by weight of the polyester-based polyurethane oligomer, 5 to 30% by weight of the polyol, and 50 to 80% by weight of the polyisocyanate, based on the total weight of the solid components of the thermosetting prepolymer composition.

4. The coating composition of claim 2, wherein the polyester-based polyurethane oligomer has a number average molecular weight of 1,000 to 100,000 g/mol.

5. The coating composition of claim 2, wherein the polyol includes one or more selected from the group consisting of polyethylene glycol polyol, polycarprolactone polyol, polyester polyol, polyether polyol, polyacryl polyol, and polycarbonate polyoldiol.

6. The coating composition of claim 2, wherein the polyisocyanate is one or more selected from the group consisting of 1,4-tetramethylene diisocyanate, 1,6-hexamethylene diisocyanate, 1,4-cyclohexyl diisocyanate, isophorone diisocyanate, α,α-xylylene diisocyanate, 4,4'-dimethylmethane diisocyante, 1,3-phenylene diisocyanate and toluene diisocyanate, or polyisocyanate polymerized from dimers or trimers thereof.

7. The coating composition of claim 1, wherein the thermosetting prepolymer composition further includes one or more catalysts selected from the consisting of dibutyltindilaurate (DBTDL), zinc octoate, iron acetyl acetonate, N,N-dimethyl ethanolamine, and triethylene diamine.

8. The coating composition of claim 1, wherein the tri to hexafunctional acrylate monomer includes one or more selected from the group consisting of trimethylolpropane triacrylate (TMPTA), trimethylolpropane ethoxy triacrylate (TMPEOTA), glycerin-propoxylated triacrylate (GPTA), pentaerythritol tetraacrylate (PETA), and dipentaerythritol hexaacrylate (DPHA).

9. The coating composition of claim 1, wherein the inorganic fine particle has a diameter of 100 nm or less.

10. The coating composition of claim 1, wherein the inorganic fine particle includes one or more selected from the group consisting of a silica nanoparticle, an aluminum oxide fine particle, a titanium oxide fine particle, and a zinc oxide fine particle.

11. The coating composition of claim 1, comprising 40 to 80 parts by weight of the tri- to hexafunctional acrylate-based monomer, 5 to 50 parts by weight of the thermosetting prepolymer composition, 0.2 to 5 parts by weight of the photoinitiator, and 5 to 40 parts by weight of the inorganic fine particle, based on 100 parts by weight of the solid components including the tri- to hexafunctional acrylate-based monomer, the thermosetting prepolymer composition, the photoinitiator, and the inorganic fine particle.

* * * * *